Dec. 17, 1968 R. S. HEARD ET AL 3,417,379

CLOCKING CIRCUITS FOR MEMORY ACCESSING AND CONTROL OF DATA PROCESSING APPARATUS

Filed Nov. 15, 1966 4 Sheets-Sheet 1

INVENTORS.
RODERICK S. HEARD
LOUIS M. HORNUNG

BY D. Kendall Cooper
ATTORNEY.

| INSTRUCTION CLASS | I1 P-ONLY | I 2 P&Q | I 3 P-ONLY | I 4 P-ONLY | I 5 P-ONLY | I 6 P ONLY | I 7 P-ONLY | I 8 P-ONLY | I 9 P-ONLY | I10 P&Q | COMMENTS |
|---|---|---|---|---|---|---|---|---|---|---|---|
| MODE | RWW | RRWW | RWW | RWW (SEE NOTE A) | RWW | RWW | RWW | RWW | RWW | RRWW | |
| INCREMENTAL JUMP | IAW → MAR +2 | M → A | A → MAR (Q ADDRESS) | M → SAMPLE BIT OF Q | | | | | | IAW±A → IAW | I 10 ONLY IF JUMP TAKEN |
| ARITHMETIC OPERATION | IAW → MAR +2 | M → A | A → MAR (Q ADDRESS) | M → B +1 IF BUMP (Q INDIRECT) | B → MAR (Q INDIRECT) | M → B | A → MAR (P ADDRESS) | M → A +1 IF BUMP (P INDIRECT) | A → MAR (P INDIRECT) | M*B → M *ADD, SUBTRACT TRANSFER OR COMPARE.) | I 4 AND I 5 ONLY IF Q IS INDIRECT. I 8 AND I 9 ONLY IF P IS INDIRECT. |
| IMMEDIATE ARITHMETIC | IAW → MAR +2 | M → A | | | | | A → MAR (P ADDRESS) | | | M*A → M IMMEDIATE DATA | |
| BRANCH | IAW → MAR +2 | M → A | A → MAR +2 JUMP ADDRESS (LINK AND TAKEN) | RRWW IAW → M +1 (LINK AND TAKEN) | | | | | | A → IAW (JUMP ADDRESS OR JUMP ADDRESS +2) TAKEN | I 3, I 4, I 10 ONLY IF JUMP TAKEN WITH LINK. I 10 ONLY IF JUMP TAKEN |
| PROGRAM CONTROL | IAW → MAR +2 | M → A | A → MAR (Q ADDRESS) | M → SAMPLE OR CHANGE BIT OF Q | | | | | | | |
| I/O | IAW → MAR +2; IF WAITING: IAW → MAR | M → A; IF WAITING: A → | A → MAR (Q ADDRESS) | M → B +1 (Q INDIRECT) | B → MAR (Q INDIRECT) | M → OUTPUT FROM M → O/R OR INPUT FROM BITS → M | | | | | I 4 AND I 5 ONLY IF INDIRECT |
| EDIT MODE | IAW → MAR; IAW → O/R IF SET ADDRESS; INHIBIT → IF CLEAR ADDRESS | M → A; M → O/R IF SET DATA; INHIBIT → IF CLEAR DATA | | | | | | | | | |

NOTE A: I4 TIME SEQUENCE IS RWW, EXCEPT FOR BRANCH, WHEN IT IS RRWW.

FIG. 7

KEY: A = A WORD; B = B WORD; M = LOCATION ADDRESSED BY MAR; IAW = INSTRUCTION ADDRESS WORD; MAR = MEMORY ADDRESS REGISTER; O/R = OUTPUT REGISTER

United States Patent Office 3,417,379
Patented Dec. 17, 1968

3,417,379

CLOCKING CIRCUITS FOR MEMORY ACCESSING AND CONTROL OF DATA PROCESSING APPARATUS

Roderick S. Heard and Louis M. Hornung, Lexington, Ky., assignors to International Business Machines Corporation, Armonk, N.Y., a corporation of New York Filed Nov. 15, 1966, Ser. No. 594,542
17 Claims. (Cl. 340—172.5)

This invention relates to memory accessing and data processing circuits, and more particularly to clocking arrangements that insure maximum data handling capabilities with minimum hardware requirements.

During the development of a computer and associated peripheral equipment for the market place, a number of basic factors must be considered. Among these, naturally, are the ultimate objectives of the customer, including his accounting and data processing requirements. Also, the parameters of the input and output equipment are significant. This includes the reading and/or recording speeds, the types of media, and related factors. Generally speaking, the customer is interested in having the greatest number of features and data handling capabilities but is also interested in obtaining these features and capabilities at the lowest possible cost. However, when a greater number of features are desired, a larger amount of hardware is usually necessary and the costs are correspondingly higher. From the manufacturer's point of view, if the cost becomes too high, the market is thereby limited and sales do not meet expectations.

Therefore, during the development of any computer system, an attempt is made to balance the features provided by the system and the cost involved for the features. Usually, when hardware and related costs are reduced, the features and capabilities of the system are also reduced, and the resulting system may be less interesting to the customer.

Therefore, an object of the present invention is to provide unique operating and circuit arrangements for data processing apparatus that permits a significant reduction in hardware while maintaining a desired level of system features and capabilities.

Another object of the invention is to provide arrangements of the nature indicated that insure optimum accessing of data stored in an associated memory as well as optimum processing of the data when it is involved in various operations in the system.

A further object of the invention is to provide a clocking arrangement for data processing apparatus that insures efficient accessing of data in memory and that offers additional flexibilty in the logical and control capabilities of the system.

Still another object of the present invention is to provide clocking arrangements that are related in a predetermined fashion to the program or instruction sequencing of the system.

Also, an object of the invention is to provide clocking arrangements that are readily implemented in relatively less expensive circuits.

An additional object of the invention is to provide a clocking arrangement for a memory-oriented data processing system that inherently compensates for processing delays encountered in the system.

A still further object of the invention is to provide clocking arrangements that are operable in a number of signal pattern modes wherein the selection of a particular mode is dependent upon the status of the program instruction sequencing in the system.

And another object of the invention is to provide for single addressing or double addressing of a data memory with the double addressing requiring considerably less time than heretofore possible.

In addition, an object of the invention is to provide only a limited number of standardized signal pattern sequences in a computer system, thereby minimizing hardware cost, while insuring that greater over-all flexibility is achieved in the operation of the system.

In order to accomplish these and other objects of the invention, signal pattern generating circuits are provided for a memory-oriented data processing system having at least two pattern modes of operation that are selected during the operation of the system according to a predetermined schedule and in dependence upon the instruction execution sequencing of the system. The arrangements disclosed herein provide for a first signal pattern mode for reading and writing data words in each of two distinct memory locations according to a Read/Read/Write/Write sequence. Another signal pattern mode provides a Read/Write/Write sequence that permits the accessing of two distinct memory locations, one of which is known to have been cleared in a previous instruction cycle, and may be used for accessing only a single address in memory. The extra Write interval may be redundant at times, but is available for various purposes. It may be used to compensate for accumulator delays in the system and/or controlling other logical operations required in the system. In this manner, a limited number of standardized signal patterns are made available in the system, but a considerable amount of flexibility is insured during memory accessing and data processing activities. The proposed signal pattern modes of operation are dependent upon and inter-related with the basic instruction sequencing of the system and are established according to a predetermined sequence during operation of the system. The signal pattern clocking modes are readily derived from less expensive hardware, thus enabling cost reduction while maintaining a desired level of features and capabilities in the system.

The foregoing and other objects, features, and advantages of the invention will be apparent from the following more particular description of the preferred embodiment of the invention as illustrated in the accompanying drawings.

Figure 4:
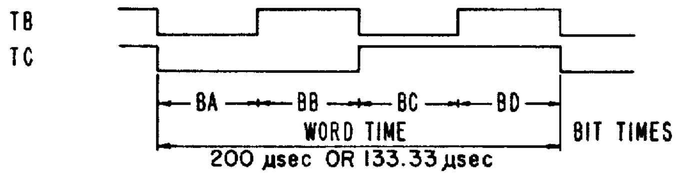
Figure 5:
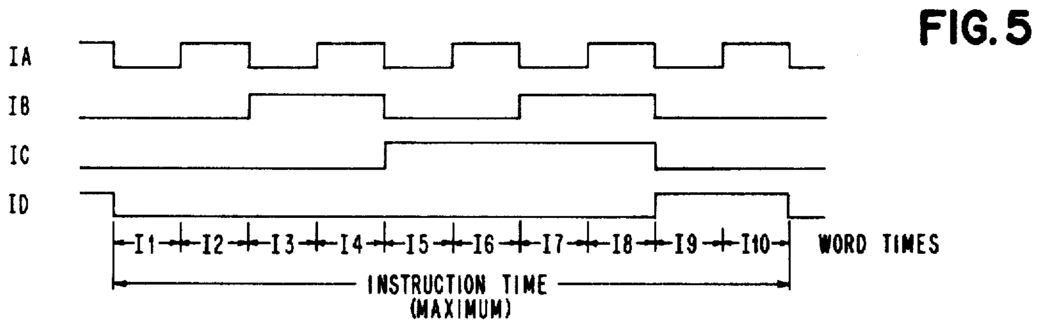

FIGS. 4 and 5 together illustrate the relationship of the Bit times, Word times, and Instruction times established during system operation.

Figure 2:
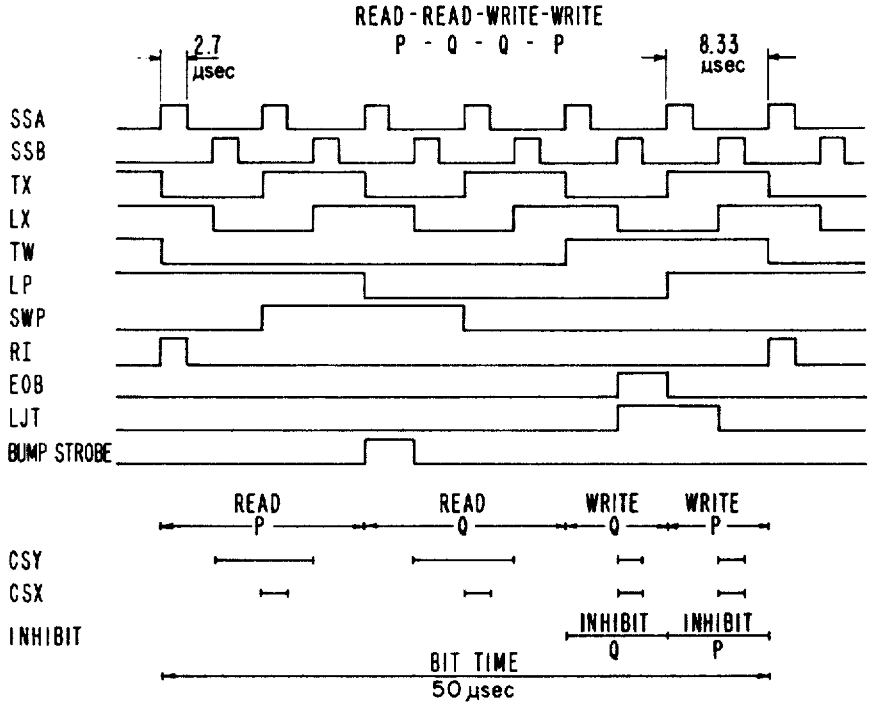
FIG. 2 illustrates the signal sequences developed during one signal pattern generating mode designated Read/Read/Write/Write.
Figure 3:
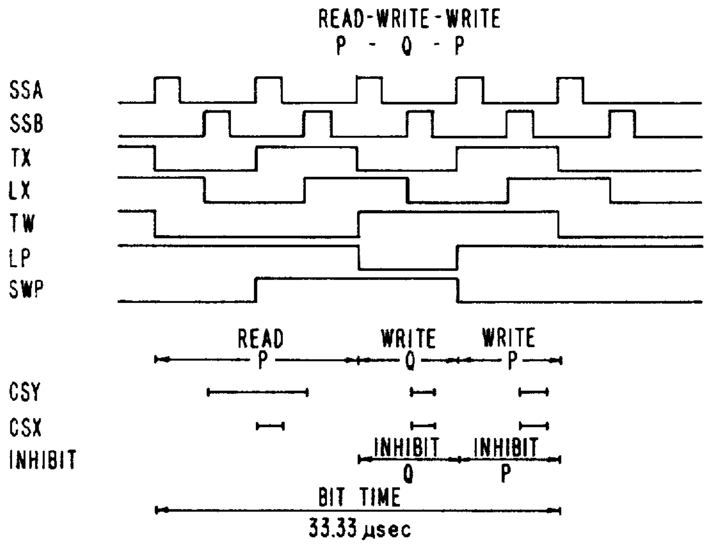
FIG. 3 illustrates an abbreviated signal sequence developed during a signal pattern mode designated Read/Write/Write.

FIGS. 6a–6g depict various latch circuits involved in establishing the signal sequences of FIGS. 2 and 3 together with various control inputs required.

Figure 1:
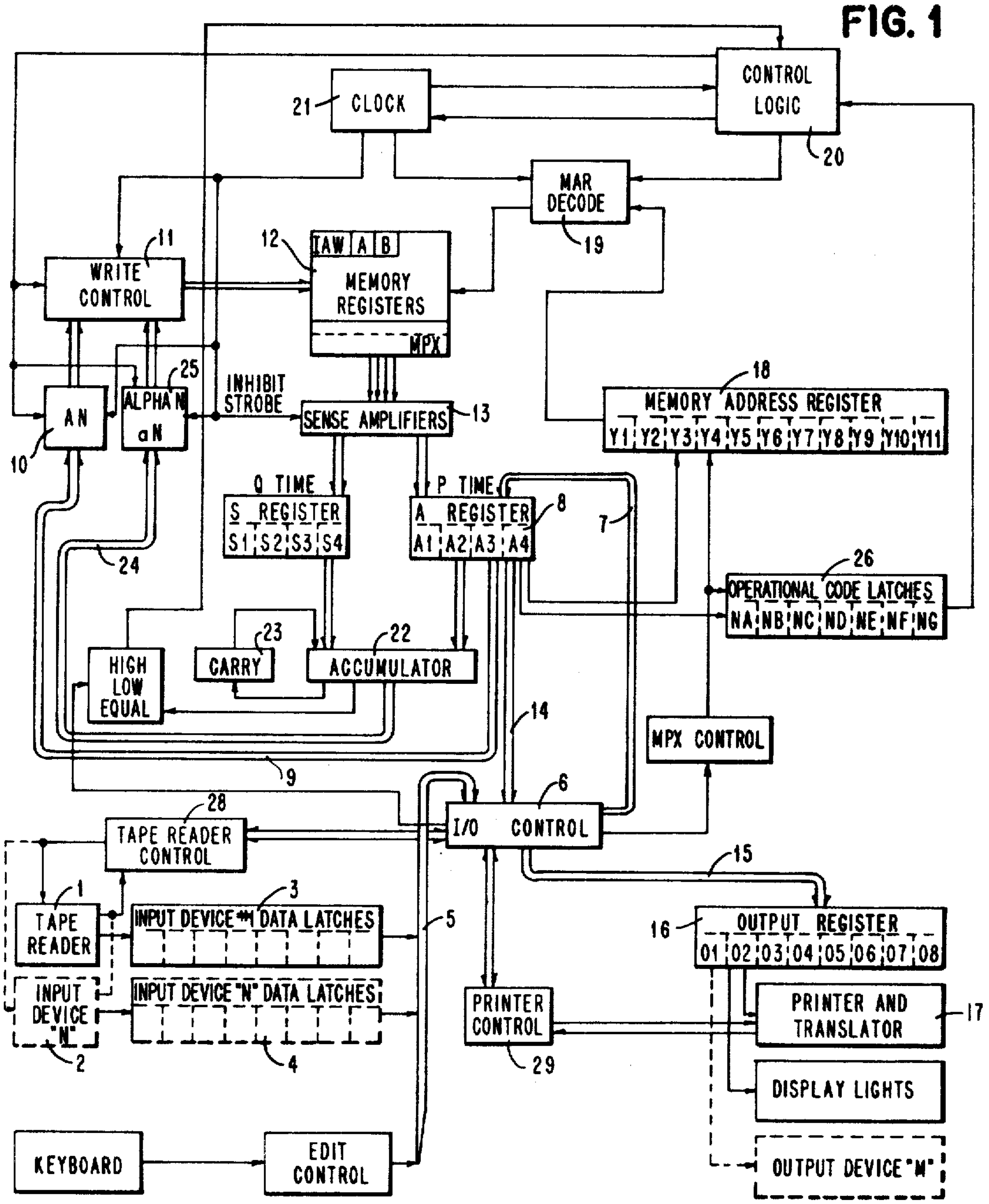
FIG. 1 represents a data processing system embodying the present invention, such as an automatic composing system for producing justified printed copy.

FIG. 7 illustrates a number of instruction sequences used in the system of FIG. 1 and shows the relationship of the signal pattern modes of FIGS. 2 and 3 with the Instruction pattern.

*Introduction, terminology, abbreviations, symbols*

As previously indicated, the diagram of FIG. 1 represents an automatic composing system for deriving justified printing from unjustified raw input data. It is assumed that the reader is familiar with most terms encountered in systems of this nature, but for convenience during subsequent discussion, a number of terms, abbreviations, and symbols used throughout the present specification are given here with definitions, where appropriate.

A word.—This is a word in core memory that contains the instruction after it has been accessed. It is also used in P word Indirect Operations. The A word is directly addressable without using the Memory Address Register.

A Register (A1, A2, A3, A4).—This is a 4-Bit Latch Register that is used to temporarily store data from the Sense Amplifiers during every P time and to transfer data during I/O instructions.

Accumulator.—The Accumulator produces the sum or difference of two 4-Bit binary numbers and stores a Carry when appropriate. The two numbers are derived from the A Register and the S Register.

AN.—A control block for writing data back to Memory from the A Register.

Alpha (α)N.—A control block for writing P time data from the Accumulator into Memory.

And-Invert (AI).—A basic circuit that supplies a 0 output when all inputs are at a 1 level for the And Invert function. If any of the inputs is at a 0 level, the output is a logical 1, and the circuit performs the Negative OR invert function. When only a single input and a single output are utilized, the output will always be the inverse of the input, and the circuit acts as an Inverter.

Figure 6A:
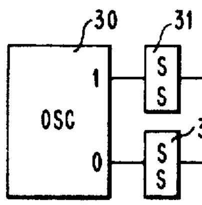
Figure 6B:
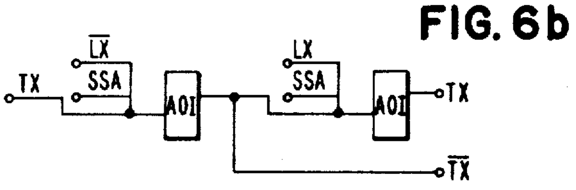
Figure 6C:
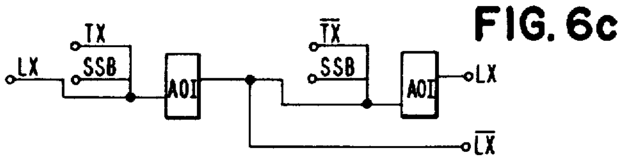
Figure 6D:
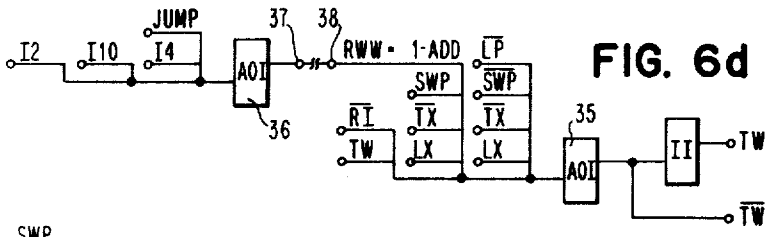

And-Or-Invert (AOI).—An And-Or-Invert (AOI) circuit, such as AOI 36, FIG. 6d, has a plurality of OR leg inputs, each leg having a number of And inputs. For example, AOI 36 has three OR legs. One OR leg has two And inputs, the others have a single input. Point 37 output is the complement of Jump 14, or I10, or 12.

Arithmetic Operation Instruction.—An instruction that directs the system to perform an Add, Subtract, Compare, or Transfer operation with a P word and Q word whose addresses are contained in the Instruction.

B word.—The B word is a word in core memory that is used to store the Q data until it is to be operated upon. Like the A word, the B word is addressed directly without the use of the Memory Address Register.

BA, BB, BC, & BD.—Bit time intervals during which four Bit positions are operated upon. The four Bit times comprise on Word time.

Bump.—A term that designates the addition of a fixed amount to a previous count representing, for example, an address in core memory. An indirect address is updated by a Bump of +1 since it comprises only a single address location of 8 bits comprising a byte. The Instruction Address Word is updated by a Bump of +2 since it comprises two adjacent address locations totalling 16 bits, or two bytes.

Bump Strobe Not Bump Strobe (BS).—A signal that controls the exact time of Bumping. Not Bump Strobe is the inverse of Bump Strobe.

Branch Instruction.—An instruction that enables the changing of sequences of program steps depending upon the High-Low-Equal latches, or unconditionally.

Bit Time Counter.—A counter that establishes four Bit times. Comprises two binary counting latch pairs (TB–LB and TC–LC). See FIG. 4.

Byte.—A group of (8) bit positions in core memory. May contain one character of alphanumeric data, a non-negative binary number from 0 to 255, half of a program step, half of a general register, or 8 individual bits used as indicators.

Carry.—Stores the arithmetic carry from the high order bit position of the Accumulator.

Clock.—A counter having 17 latches that are driven by two out-of-phase 2.7 (nominal) microsecond single shots that in turn are driven by the binary output of a trigger connected to a 240 KC Oscillator. Permutation of the clock allows generation of all internal timing signals necessary for Bit time, Word time, and Instruction time.

Control Logic.—The Control Logic determines the Word time sequence, the Write Controls, address of special words, Controls for Input/Output, whether the Accumulator adds of subtracts, and similar sequences as determined by the Instruction Flow Chart. Note FIG. 7.

CSX.—Current Switch time for X direction in core memory.

CSY.—Current Switch time for Y direction in core memory.

Direct.—Implies that Instruction has direct address signals for P and Q words.

Display.—Visual display by lights or comparable indicators of Register contents, results of arithmetic operations, and similar indications.

Edit Control. The Edit Control is divided into Set Address and Set Data. During Set Address, the contents of the Instruction Address Word may be edited. During Set Data, the contents of the byte which is addressed by the Instruction Address Word can be modified.

End of Bit (EOB).—A signal indicative of the termination of a Bit time.

General Registers.—These are Registers located in byte locations 000–0063, 32 in number (two bytes each). They can be directly addressed and are used as Index Registers, I/O Registers, working registers for arithmetics, and also may be used as instructions or as individual bytes.

High-Low-Equal Latches.—A set of latches that are used primarily to indicate the result of comparison of two words, primarily by subtraction. The status of the latches is checked to determine whether a Branch operation is required. They may be set under other circumstances, such as I/O operations, testing of individual bits, or other arithmetic operations.

IA, IB, IC, and ID.—Four latch pairs that define the ten (I1–I10) Word times required for a maximum operation. Note FIGS. 5 and 7.

I1, I2, etc. thru I10.—Designations of the ten Word time intervals. Note FIG. 5. May be any number: I1–In.

Immediate Arithmetic Instruction.—Instructs machine to perform one of four arithmetic operations, that is Add, Subtract, Compare, or Transfer, with contents of a Word location in Memory defined by the P word in the Instruction and immediate data contained in the instruction in the Q word location. The instruction enables the system to address a general register location in Memory having 16 bits of data that serve as the P word.

Incremental Branch (Jump) Instruction.—A modified Branch Instruction enabling any bit in a defined Register in Memory to be sampled, to cause a Branch to be executed to forward increment or backward increment up to 15 Program Steps.

Indirect (P and/or Q).—Indicates that a memory location addressed by an instruction contains the actual address of an operand, either the P word or the Q word.

Inhibit.—In relation to core memory, implies the inhibiting of the write operation to insure that a particular core location is retained at a 0 state. In relation to Program Steps, the Inhibit implies that an interrupted Program Step is retained so that it may be executed following the interrupting sequence.

Inhibit Strobe (IS).—A signal that inhibits the data in the Sense Amplifiers from being transferred to the S or A Registers.

Input/Output (I/O) Instruction.—An instruction that enables selection of Memory locations for storage of Input data or transfer during an Output operation. The instruction enables the selection of a particular Input or Output device as well as a normal or Multiplex mode of operation.

Input/Output (I/O) Control.—Separate logic controlled by Inhibit latch and allowing either execution of an I/O instruction or inhibiting of the instruction.

Input Register.—Eight latches store Input data for transfer to Memory.

Instructions.—Instructions are 16 bits in length. There are six (6) basic instructions as follows: (1) Arithmetic Operation, (2) Immediate Arithmetic Operation, (3) Branch, (4) Incremental Branch, (5) Input/Output, (6) Program Control (Note FIG. 7).

Instruction Address Word (IAW).—A Word location in core memory that stores the address of the next Instruction to be used. It is updated by bumping during the access of the Instruction. In order to Branch, this word is modified. The IAW is addressable directly without using the Memory Address Register.

Instruction Word Time.—One of the 10 basic time intervals used for executing instructions. Note FIGS. 5 and 7.

Isolating Inverter.—A basic circuit used to invert signals from another block, such as an AOI block, so that the Output will be at the same logical level as the Input to the AOI block.

Invert.—Implies a logical inversion of a 1 to 0 or a 0 to 1.

Jump.—Synonymous with Branch.

Latch.—A bistable storage circuit normally having one state (0) and settable to another state (1) upon application of a signal to its Input. As used herein, the term implies a setting operation of the circuit and a subsequent feedback from the output of the circuit to latch it into the state to which it has just been set.

Link Sequence.—A sequence used during a Branch operation for storing the location of the instruction that has been interrupted and to which the program should return when a Subroutine is completed.

Load J Counter (LJT).—A signal occurring near the end of the last bit time of a word time for stepping the Word Time Counter and determining the permutation of the Clock.

Load MAR.—A signal that controls the loading of the Memory Address Register.

Load Y.—Synonymous with Load MAR.

LP and Not LP ($\overline{LP}$).—The LP signal defines P word time for reading and writing while Not LP defines Q word time for reading and writing.

LX and Not LX ($\overline{LX}$).—Cooperates with TX to define the duration of memory currents.

M.—A status of the control logic indicating that the Memory Addressing is Not IAW, Not A, or Not B, and implying addressing by the MAR.

MAR Decode.—A logic block that interprets the state of the Memory Address Register for gating the proper drivers and switches to access an appropriate location in core memory.

Memory.—The Memory used in the system is a core memory that stores data as well as the Program instructions. The Memory contains three special Registers designated IAW, A word, and B word. In a typical case, the Memory size is 16K bits, with 4 bits being accessed in parallel. To address two Memory locations usually requires two Read times followed by two Write times. The Memory uses the X, Y, and Z (Inhibit) mode of operation.

Memory Address Register (MAR).—This is also referred to as the Y Register. It is an 11-Latch Register that can address any byte location in core memory. It is loaded in Odd Word Times from one of the special Registers in Memory. If reset to zeros it addresses the MPX Register. The 11 Latches enable the selection of byte locations in core memory, while the signal TB defines a half-byte interval (4 bits).

Memory Cycle Counter.—Defines Read and Write times as well as P word times and Q word times. The Counter involves one binary counter stage driving a trinary counter. The binary counting TX–LX pair drives the trinary counter comprising TW–LP–SWP. TW defines Write time; Not TW defines Read time. LP defines P word time and Not LP defines Q word time.

MPX Register.—A register that is used in multiplexing to output devices to hold the location of the next output byte.

Multiplexor (MPX) Control.—A control enabling the basic program to be interrupted whenever the Multiplex Output device is ready to receive the next character.

N Register (NA, NB, NC, etc.).—A designation that is synonymous with Op code register.

Not.—A logical inversion indicated by ($\overline{X}$): $\overline{TW}$, $\overline{LP}$, etc.

Operational (Op) Code Latches (Register).—This is a 7 latch Register that stores the instruction code for each instruction during its execution. The latches are designated N–1 through N–7. In general, the Register is Loaded at I2 time.

Or.—A logical term implying an output from a Logic block when any one of several inputs is satisfied.

Oscillator (OSC).—Drives two single shots that supply SSA and SSB signals to drive the clocking circuit.

Output Register (OR).—An 8 bit Register that stores Output data until the next Output instruction is started.

P time.—Time interval defined by LP.

P word.—Word addressed by P address field of the instruction.

Program Control Instruction.—An instruction that enables the sampling of any bit location in one of the 32 low order Registers in Memory. Bits can be set, reset, or preserved, and applied to the High-Low-Equal Latches, thereby serving as indicator bits.

Program Set.—See instructions.

Q time.—Time interval defined by Not LP.

Q word.—Word addressed by Q address field of instruction.

Read/Write Special Words (R/WS).—Directs system to address one of three special words in core memory, that is, IAW, A word, or B word.

Read/Write MB (R/W MB).—Indicates an address of Memory controlled by the MAR bits Y1 through Y11 that are decoded.

Figure 6E:
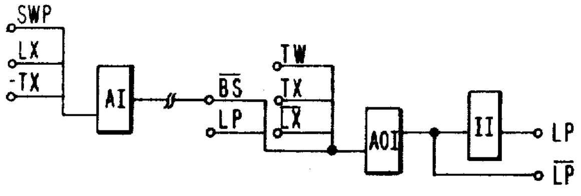
Figure 6F:
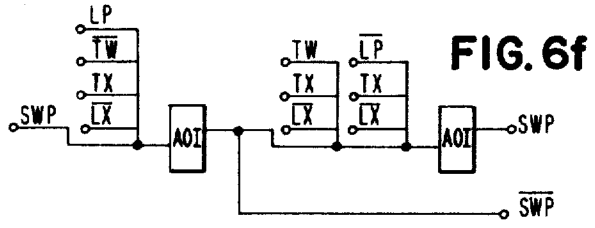
Figure 6G:
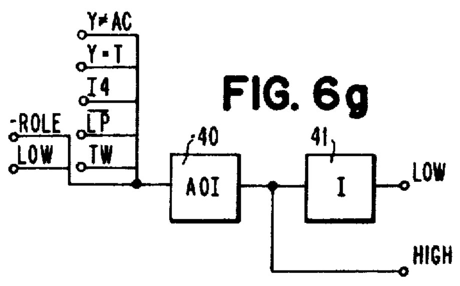

-ROLE.—Control signal used in Compare circuits, FIG. 6*g*.

Read/Write.—Reading a core implies detecting whether it has a 1 or 0. Writing the core implies storing a 1 in the core.

Read/Read/Write/Write (RRWW).—Long sequence of Read/Write signals for two address operations.

Read/Write/Write (RWW).—Abbreviated sequence for controlling access Memory for some two address operations; single address operations; and other logic.

S Register (S1, S2, S3, S4).—This is a 4-bit latch register that is used to temporarily store data read by the Sense Amplifiers during every Q time. It is also used for bumping by a count of 1 or 2.

SSA, SSB.—Out-of-phase signals supplied by circuit, FIG. 6*a*.

SWP.—Supplies a sample pulse for sampling bits and serves to steer latches TW and LP.

Sense Amplifier.—The system includes four Sense Amplifiers that detect data read from Memory.

Sense Amplifier Strobe.—A signal for sensing the state of the Sense Amplifier. May be inhibited so that it appears that all zeros have been detected, thereby clearing the Memory location.

Single Shot (SS).—Supplies timed signal under control of oscillator for clocking circuits.

Special Registers.—There are three Special Registers that may be addressed directly without using the MAR decode. They are involved in the fetching and execution of Instructions. The registers are IAW, A word, and B word.

Translator.—Device for translating code configuration from Memory into character that may be printed or displayed.

TW and Not TW.—TW defines Read time and Not TW defines Write time.

TX and Not TX.—Cooperates with LX latch to control Memory driving and to drive the trinary counter TW–LP–SWP.

Word Time Counter.—Establishes a predetermined number of Word times as controlled by the Instruction in process. May be permuted and provides up to ten Word times designated I1 through I10.

Write Control.—Controls the writing of information in core memory as determined by the AN or Alpha N blocks.

Y Register.—Synonymous with MAR.

*.—Indicates any four Arithmetic operations: Add, Subtract, Transfer, or Compare.

GENERAL SYSTEM DESCRIPTION AND DATA FLOW

The terminology presented in the previous section clarifies the system configuration of FIG. 1. As indicated, the present inventive arrangements are disclosed in connection with an automatic composing system for producing justified printed copy from unjustified input data. Prior to operation of the system, original tape, such as magnetic tape is prepared on magnetic tape recorders by operators with preparation of printed copy at the same time. The operator also inserts appropriate control codes in the tape. A magnetic tape media simplifies the preparation of the tape, in that inadvertent errors may be easily corrected by backspacing and recording over the previous recording. As characters are keyed into a tape unit, they are converted to a particular code configuration and recorded on the tape. Following preparation of one of the tapes, the operator places it in a tape reader, such as tape reader 1, FIG. 1, controlled by Tape Control 28. A second Input device, that is, another tape reader 2, may be provided for additional data input. The tape readers are provided with operator controls for effecting loading and unloading of the tape as well as searching for a particular block of information to be justified. Data from one of the tape readers 1 or 2 passes to the associated Input data Register 3 or 4, as the case may be, and by cable 5 to the I/O Control block 6. The Input registers accommodate 8 bit characters from the readers 1 or 2. Under I/O Control, the data passes by cable 7 to the A Register 8 in 4 bit sets and from there by cable 24, the Alpha N block 25, and Write Control 11, to an input data word location in Core Memory 12. Generally speaking, the characters from one of the tape readers are read in until a complete line corresponding to a printed line on a document is stored, whereupon justification procedures take place. As data is entered, the program keeps track of the number of spaces in each line and determines the apportionment of extra space in order to insure that the line is equal to a predetermined line length.

The justification procedure involves the transfer of the data in the line from an Input area in Memory 12 to an Output area in Memory 12 as a "block" of information, with calculations being performed to establish proper space length, for indentions, flushing the line right or left, centering the line, or leadering, as requirements may impose. The calculation involves the use of escapement widths that are found in a stored table in Memory 12 and that are added to the line length counter as the raw data comes into the Memory.

Following the calculations necessary to produce justified data in Memory 12, the data is then read, detected by the Sense Amplifiers 13, passed to the A Register 8, by cable 14 to the I/O control block 6, by cable 15 to the Output Register 16, and thereupon to the translator and printer in block 17 for printing controlled by Printer Control 29.

As indicated in the terminology section, a Memory Address Register 18 controls accessing of the data in Memory through an MAR decode block 19. The system operation is further specifically controlled by control logic 20 and a Clock circuit 21.

During the justification calculation procedures, a number of arithmetic operations including Add, Subtract, Transfer, and Compare are required. The system includes an Accumulator 22 that derives data from the A Register that is set at P time and from the S Register that is set at Q time for developing sums and differences with appropriate Carry storage by the Carry Latch 23. The output of the Accumulator is returned to Memory 12 by cable 24, Alpha N control 25, and Write control 11. During execution of the instructions that are shown more particularly in FIG. 7 herein, instructions are generally accessed in sequence from Memory 12 and the controlling operational codes set in the Operational Code Latches 26 for determining the subsequent operation of control logic 20 and the Clock 21.

The basic Instructions encountered in the system are six (6) in number as indicated in the terminology section. Also, under some circumstances an Edit mode is established as shown in FIG. 7. Depending upon the data manipulation required during the execution of a particular instruction, the instructions may require up to ten (10) Word times designated I1–I10. A more detailed explanation of the execution of several of the typical instructions will be presented at a later time.

Accordingly, in the manner generally outlined, justified printed copy is produced from unjustified data read into the system.

The system is "line-oriented," that is, the data stored in the tape media in tape reader 1, for example, is handled on a line-by-line basis. A number of things may be taking place concurrently in the system. For example, a line of information can be read from tape reader 1 into Memory 12 into the Input storage area while a preceding line that has been justified is read from the Output area of Memory 12 for printing by printer and translator 17. Also, calculations required for justification of the lines may be overlapping the reading in and printing out of lines of information.

In a typical system, the tape reader 1 operates at a speed that is somewhat faster than the Output printer and translator 17. As an example, the tape reader may operate at a speed of 20 characters or cycles per second. However, loading, unloading, and searching takes place at higher speed. On the other hand, the printing composer and translating unit 17 may operate only at a rate of 14 characters or cycles per second. Considering the length of a typical line of information and assuming that the tape reader 1 is free running, the tape reader, at 20 characters per second, operates on a 50 millisecond per character basis. The printer and translator 17, on the other hand, with a 14 character per second rate, operates on a 70 millisecond period. During the reading of a typical line into Memory 12, an interval of up to 500 milliseconds may be picked up due to the fact that the tape reader is that much faster throughout the length of the line than the printer is in printing the previous line. However, the justification procedures are complex and require a considerable amount of time to accomplish. In a typical system, the transfer of one line from the Input area of Memory 12 to the Output area of Memory 12, together with the justification required, may be completed only one printed character before the printing of the preceding line is completed by printer and translator 17. That is, practically the entire 500 milliseconds that are picked up, are used in the transfer process and the calculations required.

The present system incorporates unique timing arrangements that insure that the total time required to read and process input data does not exceed the time required to utilize the data on the output side. If arrangements other than those disclosed herein were provided in the system, a significant pause would occur between the completion of one printed line by printer and translator 17 and the beginning of the typing of the next line due to the delay encountered in justifying the next line in the system.

*Timing and control circuits*

In accordance with the present invention, the savings in time realized are provided by two signal pattern modes of operation that are arranged to occur in a predetermined sequence during the operation of the system and that are correlated in a predetermined manner with the Instruction sequences shown in FIG. 7. The two signal pattern sequences that are used in the present system are designated Read/Read/Write/Write (RRWW) and Read/Write/Write (RWW), respectively. In general, the Read/Read/Write/Write sequence is used when two addresses are required to be accessed from Memory 12. The Read/Read/Write/Write sequence is particularly shown in FIG. 2. On the other hand, the abbreviated accessing and control signal pattern Read/Write/Write is primarily established when a single address in Memory is required, but also provides a standardized interval for compensating for Accumulator delays present in the system and for performing various control functions required during operation of the system. The Read/Write/Write sequence is shown in FIG. 3. Accumulator delays are critical in the RWW mode when, as in I2, I4, and I7 times, sums are produced by bumping.

Either one or the other of the signal pattern sequences represents a single bit time. Four Core positions in Memory 12 may be read or written as required, during the respective Read and Write intervals, and involving, as determined by the particular sequence in question, the accessing of P words, Q words, or Special words.

A number of bit times designated BA, BB, BC, and BD are involved in a single word time, as shown in FIG. 4. Various latches in the system combine to provide 10 unique word times designated I1 through I10 (FIG. 5), with the number of word times varying with the Instruction in question and particularly arranged in a predetermined way as shown in FIG. 7.

The foregoing two signal pattern sequences enable the rapid and efficient processing of data in the system and provide a number of advantages that are relatively significant in the operation of the system.

The Read intervals, FIG. 2, are generally twice as long as the Write intervals. In a typical arithmetic operation involving two operands, arbitrarily designated P and Q, the sequence in FIG. 2 involves a Read P, Read Q, Write Q, and Write P. The operands are read during the two Read intervals and the result is written into the P word during the Write P time. The Read/Read/Write/Write sequence involves the provision of a counter that counts three (3) that is readily implemented in latches. Reference is made to FIGS. 6*a*–6*f*. An Oscillator 30, FIG. 6*a*, provides SSA and SSB Outputs from Single Shots 31 and 32, respectively. These are shown in the timing sequence of FIG. 2. The TX and LX circuits of FIGS. 6*b* and 6*c*, respectively, form a latch pair having four possible states that are driven by the SSA and SSB Outputs from Oscillator 30. FIG. 6*a*. The TX and LX states are shown in FIG. 2. The TX and LX pair drive a "3" Counter shown in detail in FIGS. 6*d*, 6*e*, and 6*f*. The TW Output defines a Write interval while the Not TW Output defines a Read interval. An LP Output from FIG. 6*e* defines a P word time while a Not LP Output defines a Q word time. By appropriate clocking of the circuits involved and control exerted by the SWP and Not SWP Outputs from FIG. 6*f*, the wave forms shown in FIG. 2 are derived.

Using the Latch circuits involved, it is somewhat difficult to arrange the circuits of FIGS. 6*d*, 6*e*, and 6*f* to count one and a half, rather than three, if a shorter Read/Write sequence is required. Therefore, the present arrangements involve the change of the "3" Counter to count "2" to establish the sequence shown in FIG. 3, that is a Read/Write/Write sequence.

The establishment of the Read/Write/Write sequence of FIG. 3 is determined essentially by the I1 through I10 Instruction configuration shown in FIG. 7. Referring to FIG. 7, the Read/Read/Write/Write sequences are established during Instruction Word times I2 and I10, as well as during Instruction Word time I4, for a Branch Instruction. At all other times during the instruction execution procedures, the Read/Write/Write sequence is established and this involves the Instruction word times I1, and I3 through I9. For explanatory purposes and in no respect intended to be limiting, typical bit times are shown in FIGS. 2 and 3, and indicated as being 50 microseconds for a Read/Read/Write/Write sequence and 33.33 microseconds for a Read/Write/Write. It is evident that a considerable savings in time required for the processing of data occurs when the shorter signal pattern sequence of FIG. 3 is used instead of the longer signal pattern of FIG. 2.

The procedure in changing from one signal pattern mode to another essentially involves the elimination of the Read Q time in FIG. 2. This is done by controlling the TW circuit of FIG. 6*d* so that the Not TW state is established for only a single Read interval shown in FIG. 3 rather than two Read intervals as shown in FIG. 2. When the signal pattern of FIG. 3 is required, the RWW single address signal 1 ADD) to the Input of the AOI circuit 35, FIG. 6*d*, is true. At SWP, Not TX, and LX time of the Clock, the output TW then becomes effective. This occurs earlier in the sequence of FIG. 3 than in the sequence of FIG. 2. The signal is derived from the AOI circuit 36 which supplies the necessary Output to terminal 37 and terminal 38 at all times during the Instruction sequencing except when Instruction Word interval I2, or I10, or Branch (Jump) and 14 time occur. In those cases, the Read/Read/Write/Write sequence of FIG. 2 is established.

To summarize the foregoing comments, the establishment of two signal pattern modes is readily effected with the Latch circuits involved. Normally, during a single address sequence only Read P and Write P are required. However, the extra interval established during the second signal pattern sequence of FIG. 3, that is, Write Q, is available for writing information into a Memory location that is known to have been previously cleared, for transferring information from one word location to another as well as writing it back to the original location and for effecting various control procedures in the system. Also, the extra Write Q interval establishes additional time that is standardized in relation to the basic Clock circuits of the system for compensating for delays encountered when data is passed through the Accumulator during arithmetic operations. As an example, it may be required to bump the contents of the IAW location during the execution of an instruction. The P word is read, applied to the Accumulator for summation with the S Register contents, which have been set to 2, and subsequently written during Write P time, FIG. 3. The Write Q time establishes an extra predetermined time interval that insures that the outputs of the Accumulator have settled down and that accurate information is available from the Accumulator for writing during Write P time.

The Accumulator of a data processing system establishes the minimum amount of time that must be allowed between the time the last piece of data is read and supplied to the Accumulator and the time that the Accumulator provides a sum to be written into Memory. In a single-address mode consisting of one Read (R) and one Write (W) operation, a minimum R time interval and a minimum W time interval are necessary. These minimum time intervals are greater for a straight RW mode, than they need to be for an RWW mode, since the circuit delays can be distributed over three time intervals in the latter case, rather than just two time intervals (RW).

In the present case, Alpha N 25 insures that data from the Accumulator 22 is written into memory only during P Write time, which is the second Write interval in either an RRWW or RWW mode. All Q time writing takes place from the A Register which has little delay and no carry involved.

As a consequence of the foregoing arrangements, an RWW code may be programed in essentially the same amount of time as an RW cycle for a given accumulator, with each individual Read or Write interval requiring less time in the RWW mode. Since this is true, the two-address RRWW mode based on the shorter Read and Write intervals is less time consuming than a comparable RRWW sequence based on the longer Read and Write intervals.

INTERRELATIONSHIP OF INSTRUCTION EXECUTION SEQUENCES AND SIGNAL PATTERN GENERATING SEQUENCES

The utility of the signal pattern sequences described and their interrelationship with typical Instruction sequences will be more apparent from a consideration of several typical Instruction operations and with more particular reference to FIG. 7.

*Immediate arithmetic instruction.—I1 Word time*

To illustrate certain aspects of the inventive arrangements, attention is first directed to the sequence that occurs when an Immediate Arithmetic operation is required during calculations. As shown in FIG. 7, the first word intervals I1 and I2 generally involve the accessing of the contents of the Instruction Address Word (IAW) in order to determine what the operation will be. As established in the terminology section, the IAW is a particular location in core memory 12 that stores the address of the next Program Step in Memory 12. The contents of the IAW are somewhat like a Program Step counter in that respect. During the accessing of IAW, it is necessary that the IAW count contents be bumped by an increment of +2 each time the word is brought from Memory in order that the next instruction in sequence will be addressed during a subsequent I1 word time.

The Instruction Word Interval I1 requires the following signal pattern sequence:

| Read | Write | Write |
|---|---|---|
| Read IAW at P time; store in A Register 8, Fig. 1. Set S Register to a count of "2" during BA time. While IAW is being Read set Memory Address Register according to IAW contents. | Used to compensate for Accumulator delays. | Write the revised IAW back into Memory bumped by a count of +2, using alpha N. |

In the foregoing situation, the extra Write time in the Read/Write/Write sequence establishes a convenient standard interval to compensate for the delay as IAW and the +2 bump factor pass through Accumulator 22, FIG. 1, on their return to Memory 12.

*I2 word time*

During I2 time, the actual instruction stored in Memory 12 is accessed as determined by the address derived from IAW and now stored in the Memory Address Register 18.

The I2 execution time of the instruction requires the signal pattern mode of FIG. 2, that is, a Read/Read/Write/Write sequence as follows:

| Read | Read | Write | Write |
|---|---|---|---|
| Read address in Memory 12 designated by Memory Address Register since Read/Write M is effective. This implies that none of the special words in Memory is accessed and that the addressing is under control of the MAR Decode block 19, Fig. 1. | Read A word to clear it. Inhibit Strobe prevents the Sense Amplifier outputs from entering the S Register. | Write Instruction derived from the addressed location into A word, using AN. | Restore Instruction to the location that was read out during Read P time, using alpha N. |

The I2 word time requires the longer signal pattern sequence of Read/Read/Write/Write in order to both read the instruction from memory and to clear the A word to receive the instruction. The Immediate Arithmetic instruction is now stored in the A word in Memory 12 and is also stored in its original program location in Memory 12 for future use. During I2 word time, the operational portion of the Instruction is also applied to the Operational Code Latches 26 to determine the subsequent operations of the system by control logic 20 and Clock 21. In the present case, the Word Clock is permuted from word time I2 directly to word time I7, FIG. 7.

*I7 word time*

The objective of the present immediate Arithmetic instruction is to perform an arithmetic operation such as Add, Subtract, etc., with one operand determined by the P address in the instruction and the other operand consisting of immediate data stored in the instruction itself in the low order 8 bit positions. During I7 word time the address of the P word required for the arithmetic operation must be loaded into the Memory Address Register 18 to permit its access. Therefore, the I7 word time interval requires a signal sequence of Read/Write/Write, FIG. 7.

| Read | Write | Write |
|---|---|---|
| Read A word into MAR. | Not used------ | Write A word contents back. At the end of I7 time, the Memory Address Register 18 contains the address of the P word operand. |

*I10 word time*

The Control logic 20 effects permutation of clock 21 to establish a word interval I10, FIG. 7. The I10 word interval requires the signal sequence of Read/Read/Write/Write. The sequence for the word interval is as follows:

| Read | Read | Write | Write |
|---|---|---|---|
| Read word location in Memory 12 addressed by MAR 18. | Read A word to derive immediate data. | Compensates for Accumulator delays. | Write results of arithmetic operations to Memory location addressed by MAR 18. |

As an alternative, when the accumulator delays are less such as in an immediate transfer (no carry) the sequence Read/Read/Write could have been used. However, in the present case, it would require a counter capable of counting 2½ which is somewhat difficult to implement.

An inspection of the instruction sequence in FIG. 7, as well as the detailed circuit of FIG. 6*d*, will indicate the direct and predetermined relationship between the signal pattern sequences for reading and writing and the instruction word time as particularly established under control of the AOI block 36.

ARITHMETIC OPERATION INSTRUCTION

Additional advantages of the signal pattern generating modes will be evident from a consideration of the Arithmetic Operation instruction that is used for ordinary arithmetic operations involving a P operand and a Q operand that may be directly or indirectly addressed.

*I1 word time*

The I1 word time of this instruction is identical to the I1 word time previously discussed in connection with the Immediate Arithmetic instruction. The IAW contents are loaded in the MAR and bumped by 2 before being returned to Memory 12, FIG. 1.

*I2 word time*

Like the I1 word time, the I2 word time is identical to that encountered during the Immediate Arithmetic operation. However, in this case, the operational code set into the Operational Code latches 26, FIG. 1, indicates that an Arithmetic Operation is required rather than an Immediate Arithmetic operation, as previously described. At the end of I2 word time, control logic 20 permutes clock 21 to step to I3 word time.

*I3 word time*

For illustrative purposes, it is assumed that both the P and Q addresses stored in the Instruction just accessed are indirect. This is indicated in the Instruction by a particular bit that is set for P Indirect and another bit that is set for Q Indirect. The use of Indirect Addressing is known to those skilled in the present art, but to summarize, when either the P or Q address is Indirect, the address in the instruction defines a location which stores another address that is the actual address of the data required during the data processing. An indication is made in the instruction as to whether the address stored at either the P or Q word location in Memory 12, FIG. 1, is to be bumped by +1 prior to being returned to Memory 12. In this manner, the locations in Memory 12 that store the P address and the Q address of the data required serve as Index Registers essentially. During the I3 word time interval, the Q address of the Instruction word that is now stored in the A word location of Memory 12 is read and transferred into the Memory Address Register 18 to control accessing of the Q data. The MAR 18 will contain the address of a location in Memory 12 that has the address of the data required. The signal pattern sequence for I3 time is as follows:

| Read | Write | Write |
|---|---|---|
| Read A word (Q address portion) and transfer to MAR 18. | Not used------ | Return data read from A word back to A word in Memory 12. |

If the address just transferred to MAR 18 were a direct address, the Program Counter would be sequenced directly from I3 time to I6 time. In the present case, however, it is assumed that the address in MAR 18, FIG. 1, is an Indirect Address. Therefore, the Program Counter is stepped from I3 word time to I4 word time.

*I4 word time*

The I4 word time requires a short signal pattern sequence as follows:

| Read | Write | Write |
|---|---|---|
| Read contents of word location in Memory 12 determined by address in MAR 18 into A Register. Set S Register to 1 during BA time for use in Bumping the Indirect Address, where required. | Write contents of A Register through AN control 10 and Write control 11 to the B word location in Memory 12. Also compensates for Accumulator delay. | Contents of S Register are added to the contents of word location addressed by MAR 18 and it is returned by Output of Accumulator 22 through Alpha N control 25, and Write control 11, to the original address in Memory 12 as determined by MAR 18. |

In the foregoing time interval, a shortened signal pattern sequence, that is, Read/Write/Write, has effected the manipulation of information in two address locations of Memory 12. This is predicated on the fact that the B word, prior to I4 time, is maintained in a clear state and is available for use whenever it is desired to transfer data into it as will be apparent in the discussion in connection with the I5 word time. At the end of the I4 word time, the B word now has the address of the actual Q data required in the Arithmetic operation. The Memory Address Register 18, FIG. 1, can now be cleared and loaded with the Address stored in the B word in Memory 12. This is done in the next word time interval.

*I5 word time*

During the I5 word time, a Read/Write/Write sequence is generated by the timing circuits, but only the Read time is actually used in connection with Memory. During this Read time, the contents of the B word in Memory 12 are transferred to the Memory Address Register 18. The two Write intervals are used for control of the clock circuits. No information is written back to Memory and the net effect of the operation during I5 word time is to leave the B word clear in readiness for receiving any data during a subsequent time interval.

*I6 word time*

Following the transfer of the B word to the Memory Address Register 18, the Instruction Counter is stepped to I6 time. During I6 time, FIG. 7, the actual Q data in Memory 12, as determined by the address stored in Memory Address Register 18, is accessed and placed in the B word location of Memory 12. The I6 word interval requires a Read/Write/Write sequence, as follows:

| Read | Write | Write |
|---|---|---|
| Read Word location in Memory 12 determined by address in MAR 18. | Write data just read into the B word through AN. | Write data from Memory 12 location read during the Read interval back into same location, through Alpha N. |

*I7 word time*

During the I7 word time, the Indirect Address of the P data is read and transferred to the Memory Address Register 18. The signal generating sequence is as follows:

| Read | Write | Write |
|---|---|---|
| The portion of the A word having the Indirect P address is transferred to MAR 18. | Not used | Not used to write Memory. The A word location is now clear. However, this interval is used for clock control. |

If the P address were a Direct Address, the Instruction execution could now proceed directly to I10 word time. However in the assumed case, the address in the MAR is an Indirect Address of the actual data and word times I8 and I9 are followed.

*I8 word time*

The I8 word time interval requires a Read/Write/Write sequence as follows:

| Read | Write | Write |
|---|---|---|
| Data in Word location of Memory 12 is read into A Register as addressed by Memory Address Register 18. S Register is set to "1" if the Bump Bit is on, during BA time. | Data stored in A Register is written into A word Memory location using AN. This time also compensates for Accumulator delay. | Original address derived during the Read time interval is restored into the same Memory location using Alpha N after it is Bumped by a count of 1 set into the S Register and added by Accumulator 22. |

The sequence followed during the I8 word time interval is comparable to that followed during the I4 time interval.

*I9 word time*

During the I9 word time interval, the contents of the A word location in Memory 12 are set into the Memory Address Register 18 and restored to the same location in Memory 12. The signal pattern sequence is a Read/Write/Write.

| Read | Write | Write |
|---|---|---|
| A word contents are read and transferred to Memory Address Register 18. | Not used | A word contents are restored to A word location. |

*I10 word time*

After all of the foregoing manipulations, the Memory Address Register 18 now contains the address of the P data and the B word location in Memory 12 now contains the Q data. As indicated by the asterisk (*) in FIG. 7, one of the Arithmetic operations—Transfer, or Compare—is now performed using Accumulator 22, and when no Indirect addressing is involved, Add and Subtract operations can also be performed. The result is returned to the location in Memory addressed by Memory Address Register 18. The signal sequence required during I10 word time is as follows:

| Read | Read | Write | Write |
|---|---|---|---|
| Data stored at Address indicated by Memory Address Register 18 is read into a Register. | Data stored in B word is transferred into S Register. | This time interval compensates for delays through Accumulator 22 as Arithmetic operations are performed on the P and Q data from the A and S Registers. The B word is not written into and therefore is left in a cleared condition for subsequent use in other Instruction operations. | Accumulator 22 is transferred to the Alpha N control 25 and Write control 11 and returned to the location in Memory 12 determined by Memory Address Register 18. For a compare operation, AN is used. |

OTHER ASPECTS AND FEATURES OF THE SYSTEM

The establishment of particular predetermined signal patterns offers additional advantages in executing other instructions in the system. Attention is directed to a Branch (Jump) Instruction sequence as shown in FIG. 7. Generally, the operation during the I1 and I2 word times is as described before in connection with the other instructions previously discussed. In the performance of a Branch Instruction, the Instruction Address Word in Memory 12, FIG. 1, is modified so that the system will derive a different Instruction from that which would normally occur without the Branch. If a Branch operation is indicated, the Word time counter is permuted to the I10 count interval. The A word in Memory 12 presently contains the address of the Memory location to which the system is directed if a Branch is taken. During the I10 word interval, the signal pattern sequence is as follows:

| Read | Read | Write | Write |
|---|---|---|---|
| The IAW word is read in order to clear its contents. | The A word contents are read. | Compensates for Accumulator delay. | The A word contents previously read are transferred to the IAW location in Memory 12. |

The "Link" aspect of the Branch Instruction shown in I3 and I4 times enables the storing of the address of the interrupted instruction so that the system can be returned to the original program sequence upon completion of the subroutine. The I3 word time involves a Read/Write/Write sequence with the A word contents transferred to the Memory Address Register and bumped by +2 before being returned to the A word location in Memory 12.

Generally speaking, the instructions indicated in FIG. 7 require a Read/Write/Write in I4 time also. An exception, however, is the Branch I4 word interval when a Read/Read/Write/Write sequence is taken in order to transfer the contents of the IAW word in Memory 12 to another location in Memory 12 designated by "M" with a +1 added to the IAW prior to its being restored. The sequence is as follows:

| Read | Read | Write | Write |
|---|---|---|---|
| Read contents of IAW. | Read M Memory location to clear it. | Write IAW contents to cleared M location. Also compensates for Accumulator delays. | Write contents of IAW +1 into IAW location of Memory 12. |

COMPARE CIRCUIT CONTROL

Reference is made to FIG. 6*g* which illustrates a Compare circuit for indicating a High or Low condition of one word from Memory 12 in relation to another word. The circuit includes an AOI block 40 and an I block 41. A number of signals including -ROLE, and LOW control one And condition to the circuit for Latching purposes. However, the primary input of interest in the present case is the one involving the $Y \neq AC$, $Y = T$, I4, Not LP, and TW to the AOI block 40. An inspection of the Read/Write/Write sequence of FIG. 3 indicates that the Not LP and TW signals correspond to the first Q Write interval in the sequence shown.

Therefore, the extra Write interval, that is Write Q time, FIG. 3, provides a convenient place to set the Compare Latch circuit in FIG. 6*g* that would otherwise not be available. This is another example of how the shortened time sequence of Read/Write/Write serves not only for accessing the Memory in a convenient manner, but serves also for establishing time intervals during which various control operations such as that just described, can be performed.

PERMUTATION OF WORD TIME CLOCK

The signal pattern sequences may be used for other control functions, such as stepping the word time counter according to the count permutation shown in FIG. 7 and depending upon the Instruction that is in process. The sequence of FIG. 2 includes a number of signals designated Reset Instruction Word Time Counter (RI), End of Bit (EOB), and Load J Counter (LJT). The signals indicated are used in the system to step the Instruction Counter to its next permutation as determined by the chart of FIG. 7, during the End of Bit time and Load J Counter time that occur concurrently with the Write Q time. This would normally occur during the BD bit time shown in FIG. 4.

SUMMARY

From the foregoing discussion, it is evident that the arrangements disclosed herein provide considerable flexibility in accessing of Memory and controlling of system operations, while effecting a significant reduction in the time required for processing data. Thus, the establishment of one or the other of two modes of signal pattern generation, correlated with the Instruction word times as set forth insures that the necessary processing is completed in adequate time, consistent with the operation rates of the Input and Output devices associated with the system.

It is to be understood that the specific indications of cycle operating times as well as the circuit configurations are given only to clarify the inventive arrangements and are not intended to be limiting.

As further examples, the following signal patterns might prove useful:

(1) RDW, where D is a standard delay time interval.
(2) RWWW . . . W, where R is Read to Accumulator, last W is Write interval from Accumulator, and other W's include Write intervals not provided for delay compensation.
(3) RRWWWW, where first R is actually read time of last operand to the Accumulator and last W is Write time from the Accumulator.
(4) R1/R2/W/W1/W2, where R1 and R2 are last read times for two Accumulators 1 and 2, respectively, and W1 and W2 are respectively associated Write intervals.

While the invention has been particularly shown and described with reference to a preferred embodiment, it will be understood by those skilled in the art that various changes in form and detail may be made without departing from the spirit and scope of the invention.

What is claimed is:

1. Apparatus for processing data according to selected programed instruction sequences, comprising:

clocking means for providing predetermined clocking signal sequences to time the execution of programed instructions in said apparatus;

means for generating a plurality of signal patterns, each having a predetermined unique combination of control signals for accessing data in said apparatus one of said signal patterns including at least one redundant control signal interval that is thereby available for use in data accessing operations or control of said apparatus;

and signal pattern control means for selectively establishing said signal pattern sequences as required during operation of said apparatus.

2. The apparatus of claim 1, wherein:

said clocking means is responsive to signals indicative of a plurality of different instructions, each instruction comprising a predetermined number of operating intervals occurring in a predetermined sequence, and wherein said signal pattern control means responds to said instruction signals to establish said signal sequences in a succession that is correlated in a predetermined manner with said operating intervals.

3. The apparatus of claim 2, wherein:

said operating intervals comprise a plurality of word time intervals designated I1–In, wherein said signal pattern sequences include at least a set of Read/Write signals and an additional redundant Read or Write signal interval, and wherein said signal pattern control means is operable to establish said Read/Write signal sequences in a predetermined succession that is correlated with said word time intervals.

4. Apparatus for processing data according to selected programed instruction sequences, comprising:

data memory means, said memory means having facilities for storing data in a plurality of addressable locations and operable to access said data under control of Read signals that clear said locations and Write signals that set said locations;

clocking means for providing predetermined clocking signal sequences to time the execution of programed instructions in said apparatus;

means for generating a plurality of signal patterns, each having a predetermined unique combination of Read and Write signals for accessing said memory locations, one of said patterns including at least one redundant Read or Write signal interval that is thereby available for use in data accessing operations or control of said apparatus;

and signal pattern control means for selectively establishing said signal pattern sequences as required during operation of said apparatus.

5. The apparatus of claim 4, wherein:

said memory means is a core memory having data stored in addressable word locations, wherein said clocking means operates in predefined word time intervals designated I1–In, wherein said generating means generates a first pattern of Read/Read/Write/Write signal intervals and a second pattern of Read/Write/Write signal intervals, and wherein said signal pattern control means is operative in dependence upon I1–In signals to establish in a correlated manner one or the other of said Read and Write signal sequences as required during operation of said apparatus.

6. The apparatus of claim 4, wherein:

the selection of signal patterns is correlated in a predetermined manner with the clocking signal sequences according to the particular instruction that is effective in said apparatus.

7. The apparatus of claim 6, wherein:
said predetermined correlation of signal patterns and clocking signal sequences is standard and invariable for each instruction used in the system.

8. The apparatus of claim 7, wherein:
said invariable correlation of signal patterns and clocking intervals is altered for particular instructions and particular clocking signal intervals.

9. The apparatus of claim 4, wherein:
said redundant signal interval occurs between a Read and a Write operation, thereby serving to establish a predetermined time delay interval in order to compensate for Accumulator delays encountered during Arithmetic operations in the apparatus.

10. The apparatus of claim 5, wherein:
said signal pattern control means is effective to establish signal pattern sequences that insure the clearing of selected word locations in said data memory in order that the redundant Write interval in the sequence Read/Write/Write may be used during a subsequent signal pattern sequence to set any of said selected word locations in said data memory without a concurrent Read operation.

11. The apparatus of claim 4, wherein:
a redundant time interval in one of said signal pattern sequences provides time near the termination of each word time interval I1–In to step said clocking means to the next subsequent word time interval required.

12. The apparatus of claim 4, further comprising:
comparing circuit means operative to indicate a High, Equal, or Low status of two data words from said data memory, and wherein
said redundant Read or Write interval is used to gate said compare circuitry.

13. The apparatus of claim 5, wherein:
said Read/Read/Write/Write signal pattern sequence is normally used for accessing two word locations in said data memory,
said signal pattern control means establishes said signal pattern sequences so that a selected word location may be cleared of information and said abbreviated Read/Write/Write sequence is used for a two-address mode of operation involving reading and writing of data in one memory location and writing of information in a second memory location.

14. The apparatus of claim 5, wherein:
said signal pattern generating means includes a counter operable in one mode to count 1–2–3 and in another mode to count 1–3, wherein
said signal pattern control means is effective to establish one of the two counting modes of said counter, and wherein the Read and Write intervals correspond to the counting intervals as follows:

*Counter status*

Read/Write Mode:

| | |
|---|---|
| **1** | Read |
| **2** | Read |
| **3** | Write/Write |

15. The apparatus of claim 4, characterized as an automatic composing system, and further comprising:
input equipment for supplying raw unjustified data;
logical means associated with said clocking and signal pattern generating means for arithmetically manipulating said unjustified data to derive justified data therefrom;
output utilization means for printing or displaying said justified data; and wherein
said signal pattern control means is rendered effective during said arithmetic manipulations to establish an abbreviated signal pattern sequence according to a schedule that saves processing time and insures that said justified data is available when required by said Output equipment.

16. The apparatus of claim 5 wherein:
said generating means includes a bistable latch circuit operable in one state to supply a Read signal and in another state to supply a Write signal; and wherein
said signal pattern control means maintains said latch circuit in said one state a sufficient time interval to define the Read/Read intervals in said first pattern and in said one state an abbreviated time interval to define the Read interval in said second pattern.

17. The apparatus of claim 9 wherein:
said redundant signal interval serves to compensate for delays in two accumulator circuits operating concurrently during Arithmetic operations.

References Cited

UNITED STATES PATENTS

| | | | |
|---|---|---|---|
| 2,977,576 | 3/1961 | Mayo | 340—174 |
| 2,989,732 | 6/1961 | Young | 340—172.5 |
| 3,008,129 | 11/1961 | Katz | 340—174 |
| 3,067,937 | 12/1962 | Hinkein et al. | 340—172.5 |
| 3,195,114 | 7/1965 | Gunderson et al. | 340—174 |
| 3,228,005 | 1/1966 | Delmege et al. | 340—172.5 |
| 3,249,920 | 3/1966 | Pulver | 340—172.5 |
| 3,327,293 | 6/1967 | Held | 340—172.5 |

PAUL J. HENON, *Primary Examiner.*

JOHN P. VANDENBURG, *Assistant Examiner.*